UNITED STATES PATENT OFFICE.

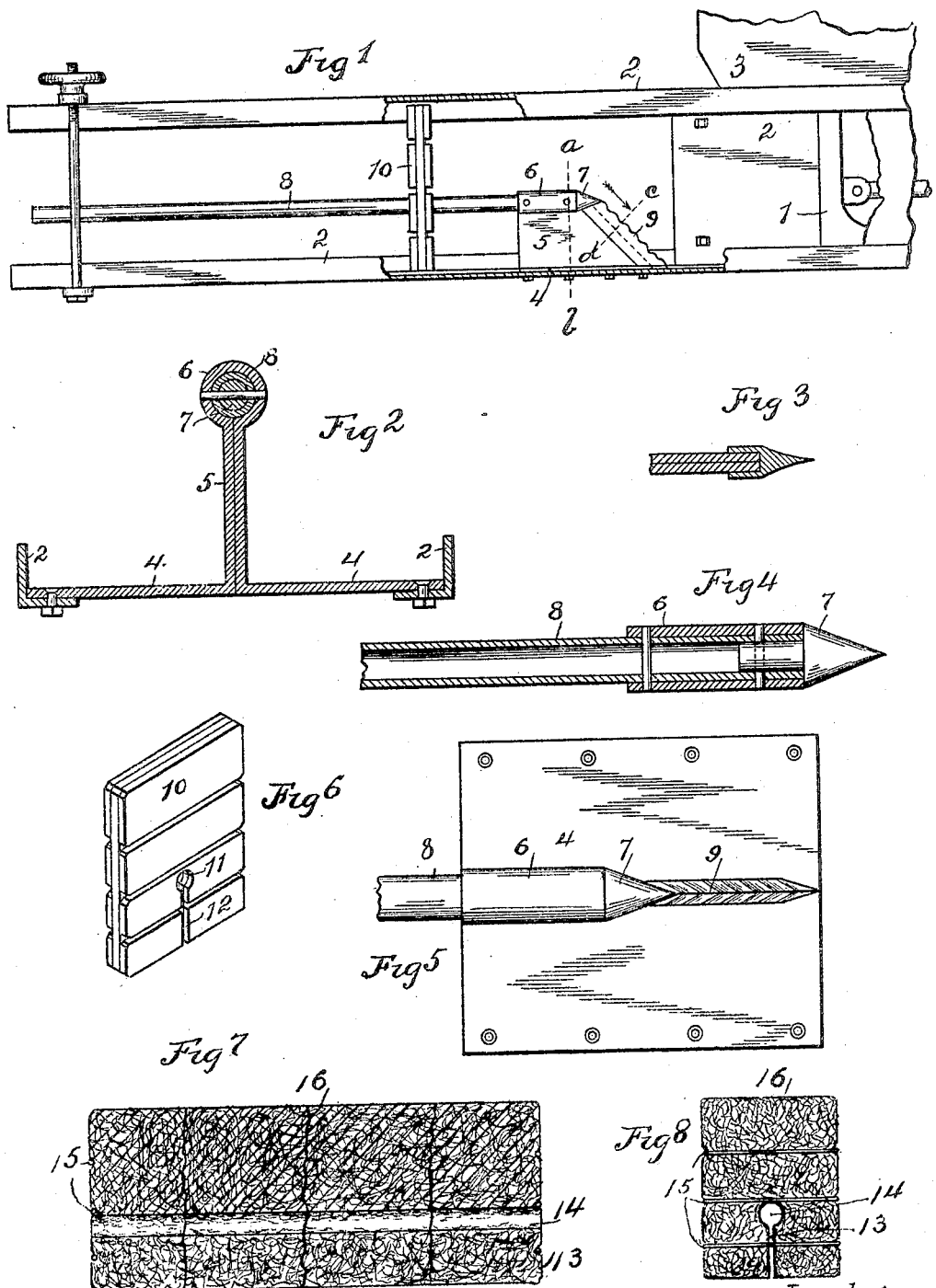

JOHN NORTH AND WILLIAM H. NORTH, OF KANSAS CITY, MISSOURI.

BALING-PRESS.

No. 817,984.      Specification of Letters Patent.      Patented April 17, 1906.

Application filed June 3, 1905. Serial No. 263,559.

*To all whom it may concern:*

Be it known that we, JOHN NORTH and WILLIAM H. NORTH, citizens of the United States, residing at Kansas City, in the county of Jackson and State of Missouri, have invented certain new and useful Improvements in Baling-Presses, of which the following is a specification.

Our invention relates to improvements in baling-presses.

The object of our invention is to provide a baling-press for baling hay or similar material with means by which a longitudinal hole is formed in the bale during its construction for the purpose of admitting air to the middle of the bale, and thus prevent the material from mold or decay.

Our invention provides, further, means by which the bale from one side to said hole is longitudinally divided for the purpose of admitting air to the most densely-compressed portion of the bale.

In its preferable form our invention provides a baling-chamber having therein a longitudinal core around which the hay or similar material is compressed, the bale when ejected from the chamber after tying being forced from the core.

Our invention provides, further, a cutting or dividing blade by which the layers forming the bale are divided from one edge to the hole formed therein by the core.

Our invention provides, further, a novel form of block to be employed in connection with the core and blade and used to support the end of the bale during compression.

Other novel features are hereinafter fully described and claimed.

In the accompanying drawings, Figure 1 is a side view, partly in elevation and partly in vertical section, of a portion of a baling-press provided with our improvement. Fig. 2 is a vertical section taken on the dotted line *a b* of Fig. 1. Fig. 3 is a cross-section taken on the dotted line *c d* of Fig. 1. Fig. 4 is a horizontal sectional view of a portion of the core. Fig. 5 is a top view of a portion of the core and cutting-blade. Fig. 6 is a perspective view of one of the baling-blocks. Fig. 7 is a longitudinal vertical sectional view of a bale of hay formed by our process. Fig. 8 is an end elevation view of a bale formed by our improved process.

Similar characters of reference denote similar parts.

1 denotes the reciprocating plunger, 2 the framework of the baling-chamber, and 3 the feed-hopper, of the ordinary hay-baling press. Upon the bottom of the baling-chamber forward of the feed-hopper 3 is mounted the core which forms the hole lengthwise through the bale. This core comprises, preferably, a horizontal portion 4, secured at its lateral edges upon the bottom of the baling-chamber 2 and having a longitudinal vertical portion 5 surmounted by a tubular longitudinal portion 6, in the forward end of which is secured a conical pin 7, in the rear end of which is secured the forward end of a horizontal longitudinal tube 8. The tubular portion 6 is located, preferably, in a medial line a little below the central portion of the chamber 2. The forward edge of the vertical portion 5 of the core is downwardly and forwardly inclined and has mounted thereon a cutting-blade 9, the cutting edge of which is preferably curvilinear in form. The rear or outer end of the core is unsupported, the forward end being supported by the vertical portion 5, having the horizontal portion 4.

10 denotes one of a series of head-blocks between which the hay is compressed. Each block 10 is provided with a transverse hole 11, adapted to receive the horizontal portion 6 of the core. Each block is also provided with a slot 12, extending from the lower edge of the block to the hole 11, said slot and hole forming a laterally-slotted portion of the block to permit the passage therethrough of the blade 9 and the core.

In operating our invention the hay is fed downwardly through a feed-opening provided in the hopper 3 in a series of installments in the manner common to baling-presses of this character. The several installments form the layers composing the bale. As each layer is fed forward it is formed around the tubular portions 6 and 8, which form a hole from end to end through each layer. That portion of each layer below the core 6 is divided from the lower edge to the hole formed by the tubular portion 6 by the cutting-blade 9. This portion of the bale is always the portion most densely compressed, and by thus dividing it after the bale has been formed and tied a longitudinal air-space is formed lengthwise through the bale 16, as denoted by the vertical slot 13 and hole 14. (Shown in Fig. 8.) After a sufficient number of layers to form a bale have been inserted and compressed in the baling-chamber the bale is tied in the ordinary manner by passing the bale tie-wires 15 lengthwise around the bale, after which the bale is ejected from the chamber in the ordinary manner.

Our invention is subjective to various modifications without departing from its spirit.

Having thus described our invention, what we claim, and desire to secure by Letters Patent, is—

1. The combination with the baling-chamber, of means by which pressure is applied to the hay or similar material, means by which a hole is formed lengthwise through the bale during compression of the material forming the bale, and means secured to one inner side of the baling-chamber for longitudinally dividing the bale from one side to the said hole.

2. The combination with the baling-chamber provided with a lateral feed-hopper, of the longitudinally-reciprocative plunger in said chamber, means for forming a longitudinal hole through the bale during compression of the material forming it, and means secured to one inner side of the baling-chamber for longitudinally dividing the bale from said hole to the side of the bale opposite the side of the baling-chamber through which the material is fed into the chamber.

3. The combination with the baling-chamber, of the reciprocative plunger mounted therein and a core in said chamber having a longitudinal horizontal portion and a longitudinal vertical portion secured to one inner side of said chamber and around which the hay or similar material is compressed by the plunger.

4. The combination with the baling-chamber, of the reciprocating plunger mounted therein, a longitudinal core in said chamber around which the hay or similar material is compressed by the plunger, and a hay-dividing device extending from the core and secured to one side of the baling-chamber.

5. The combination with the baling-chamber, of the reciprocating plunger mounted therein, a core disposed longitudinally in said chamber around which the hay or similar material is compressed by said plunger, and a cutting-blade between the plunger and the core and extending from said core and secured to one side of the baling-chamber.

6. The combination with the baling-chamber, of the reciprocating plunger mounted therein, a core disposed longitudinally in said chamber and around which the hay or similar material is compressed by said plunger, and an inclined cutting-blade extending from said core to one side of the baling-chamber.

7. The combination with the baling-chamber, of the reciprocating plunger mounted therein, a core disposed longitudinally in said chamber and around which the hay or similar material is compressed by the plunger, and a cutting-blade having a curvilinear cutting edge and extending from the core to one side of the baling-chamber.

8. The combination with the baling-chamber of the reciprocating plunger mounted therein, a core disposed longitudinally in said chamber and around which the hay or similar material is compressed by the plunger, and an inclined blade having a curvilinear cutting edge and extending from the core to one side of the baling-chamber.

9. The combination with the baling-chamber, of the reciprocating plunger mounted therein, a core mounted in said chamber having a longitudinal horizontal portion, and a longitudinal vertical portion supporting at its forward end the horizontal portion, and a cutting-blade disposed in front of and parallel with said vertical portion and extending from the horizontal portion of the core to one side of the baling-chamber.

10. The combination with the baling-chamber, of the reciprocating plunger mounted therein, a longitudinal core in said chamber around which the hay or similar material is compressed by the plunger, and a longitudinally-movable head-block having a hole through which the said core extends.

11. The combination with the baling-chamber, of the reciprocating plunger mounted therein, a core having a longitudinal horizontal portion and a vertical portion disposed longitudinally between the horizontal portion and one side of the baling-chamber, and a longitudinally-movable head-block slotted transversely from one edge toward its middle to receive therein the two portions of the core.

12. The combination with the baling-chamber, of the reciprocating plunger mounted therein, a longitudinal core in said chamber around which the hay or similar material is compressed by the plunger, a cutting-blade extending from the core to one side of the baling-chamber, and a longitudinally-movable head-block slotted from one edge to permit the passage therethrough of the core and cutting-blade.

13. The combination with the baling-chamber, of the reciprocating plunger mounted therein, a longitudinal core around which the hay or similar material is compressed by the plunger, an inclined cutting-blade disposed between the core and the plunger and extending from said core to one side of the baling-chamber, and a longitudinally-movable head-block slotted in one edge to receive therethrough said core and cutting-blade.

14. The combination with the baling-chamber, of the reciprocating plunger mounted therein, a longitudinal core around which the hay or similar material is compressed by the plunger, an inclined blade having a curvilinear cutting edge and extending from the core to one side of the baling-chamber, and a longitudinally-movable head-block slotted in one edge to receive therethrough said core and blade.

15. The combination with the baling-chamber provided with a lateral feed-opening, of the reciprocating plunger mounted in the chamber, a longitudinal core having a horizontal portion and provided with a vertical portion extending from the horizontal portion to the side of the chamber opposite the side having the feed-opening.

16. The combination with the baling-chamber provided with a lateral feed-opening, of the reciprocating plunger longitudinally movable in the chamber, a longitudinal core having a horizontal portion and provided with a vertical portion extending from the horizontal portion to the side of the chamber opposite the side having the feed-opening, and a cutting-blade disposed between the vertical portion of the core and the plunger and extending from the horizontal portion of the core to the side of the baling-chamber.

17. The combination with the baling-chamber provided with a lateral feed-opening, of the reciprocating plunger longitudinally movable in the chamber, a longitudinal core having a horizontal portion and provided with a vertical portion extending from the horizontal portion to the side of the chamber opposite the side having the feed-opening, and an inclined cutting-blade disposed between said vertical portion and the plunger and extending from the horizontal portion to one side of the baling-chamber.

18. The combination with the baling-chamber having a lateral feed-opening, of the reciprocating plunger longitudinally movable in the chamber, a longitudinal core in the chamber having a horizontal portion unsupported at its rear end and having a supporting vertical portion at its forward end extending from the horizontal portion to the side of the baling-chamber opposite the side having the feed-opening.

19. The combination with the baling-chamber having a lateral feed-opening, of the reciprocating plunger longitudinally movable in the chamber, a longitudinal core in the chamber having a horizontal portion unsupported at its rear end and having a supporting vertical portion at its forward end extending from the horizontal portion to the side of the baling-chamber opposite the side having the feed-opening, and a longitudinally-movable head-block slotted in one edge to receive therethrough said core.

20. A core for a baling-chamber comprising a horizontal longitudinal body unsupported at its rear end and provided at its forward end with a longitudinal vertical portion supporting the horizontal portion and having means for being supported at its lower end to the bottom of the baling-chamber.

In testimony whereof we affix our signatures in presence of two witnesses.

JOHN NORTH.
WILLIAM H. NORTH.

Witnesses:
WARREN D. HOUSE,
R. E. HAMILTON.